(12) United States Patent
Rippl et al.

(10) Patent No.: US 7,774,894 B2
(45) Date of Patent: Aug. 17, 2010

(54) MICRO POWERED FLOOR CLEANING DEVICE

(75) Inventors: Carl G. Rippl, Appleton, WI (US);
Jeffrey D. Lindsay, Appleton, WI (US);
Eric F. Wagner, Sherwood, WI (US);
Fung-Jou Chen, Appleton, WI (US);
Frank G. Druecke, Oshkosh, WI (US);
David J. Tyrrell, Decatur, GA (US);
Kim Ellefson, Oshkosh, WI (US); Mary Jo Meyer, Neenah, WI (US); Timothy M. McFarland, Neenah, WI (US);
Thomas M. Ales, III, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1345 days.

(21) Appl. No.: 11/247,484

(22) Filed: Oct. 11, 2005

(65) Prior Publication Data

US 2007/0079470 A1  Apr. 12, 2007

(51) Int. Cl.
*A47L 11/30* (2006.01)
(52) U.S. Cl. .............................. 15/320; 15/118; 15/231; 15/128
(58) Field of Classification Search .................. 15/320, 15/228, 229.3–229.9, 144.1, 231, 128, 118; 134/6
See application file for complete search history.

(56) References Cited

U.S. PATENT DOCUMENTS

| | | | |
|---|---|---|---|
| 2,637,062 A * | 5/1953 | Sutton et al. .................. | 15/324 |
| 3,796,186 A | 3/1974 | Bounds et al. | |
| 4,541,132 A | 9/1985 | Long | |
| 4,549,243 A | 10/1985 | Owen et al. | |
| 4,561,037 A | 12/1985 | MacLaine et al. | |
| 4,649,895 A | 3/1987 | Yasuki et al. | |
| 4,663,639 A | 5/1987 | Owen et al. | |
| 4,728,843 A | 3/1988 | Mishiro | |
| 4,965,977 A | 10/1990 | White | |
| 5,121,884 A | 6/1992 | Noakes | |
| 5,184,778 A | 2/1993 | Noakes | |
| 5,222,664 A | 6/1993 | Noakes et al. | |
| 5,251,416 A | 10/1993 | White | |
| 5,626,936 A | 5/1997 | Alderman | |
| 5,755,578 A * | 5/1998 | Contant et al. ................. | 439/23 |
| 5,810,265 A | 9/1998 | Cornelius et al. | |

(Continued)

FOREIGN PATENT DOCUMENTS

EP  1113518 A1  7/2001

(Continued)

OTHER PUBLICATIONS

English Translation Patent Abstract of Japan 2001-275908.

(Continued)

*Primary Examiner*—Lee D Wilson
(74) *Attorney, Agent, or Firm*—Dority & Manning, P.A.

(57) ABSTRACT

A floor-cleaning apparatus includes a cleaning head having a cleaning device, a control handle connected to the cleaning head for controlling the cleaning head and a micro power source in communication with the cleaning device. The micro power source is lightweight, compact, and rechargeable or replaceable for generating energy to power the cleaning device.

30 Claims, 7 Drawing Sheets

U.S. PATENT DOCUMENTS

| | | | |
|---|---|---|---|
| 5,895,418 A | 4/1999 | Saringer | |
| 5,927,618 A | 7/1999 | Jefferies et al. | |
| 5,932,011 A | 8/1999 | Noakes et al. | |
| 5,932,940 A | 8/1999 | Epstein et al. | |
| 6,079,634 A | 6/2000 | Noakes et al. | |
| 6,138,671 A | 10/2000 | Noakes et al. | |
| 6,311,903 B1 | 11/2001 | Gaw et al. | |
| 6,318,647 B1 | 11/2001 | Gaw et al. | |
| 6,326,097 B1 | 12/2001 | Hockaday | |
| 6,376,444 B1 | 4/2002 | Hortel et al. | |
| 6,392,313 B1 | 5/2002 | Epstein et al. | |
| 6,517,648 B1 | 2/2003 | Bouchette et al. | |
| 6,541,149 B1 | 4/2003 | Maynard et al. | |
| 6,589,294 B2 | 7/2003 | Hortel et al. | |
| 6,689,466 B2 | 2/2004 | Hartmann | |
| 6,703,127 B2 | 3/2004 | Davis et al. | |
| 7,038,416 B2 * | 5/2006 | Erko et al. | 318/560 |
| 7,362,064 B2 * | 4/2008 | Coates et al. | 318/286 |
| 2001/0029911 A1 | 10/2001 | Yang et al. | |
| 2002/0061954 A1 | 5/2002 | Davis et al. | |
| 2002/0170137 A1 * | 11/2002 | Coates et al. | 15/320 |
| 2003/0053643 A1 | 3/2003 | Bank et al. | |
| 2003/0062723 A1 | 4/2003 | Mancl et al. | |
| 2004/0211189 A1 | 10/2004 | Arnold | |
| 2004/0244138 A1 * | 12/2004 | Taylor et al. | 15/319 |
| 2005/0058874 A1 | 3/2005 | Drake et al. | |
| 2005/0102789 A1 * | 5/2005 | Hopper | 15/320 |
| 2007/0079470 A1 * | 4/2007 | Rippl et al. | 15/320 |

FOREIGN PATENT DOCUMENTS

| | | |
|---|---|---|
| EP | 1 243 218 A | 9/2002 |
| EP | 1 329 972 A | 7/2003 |
| JP | 54058954 | 5/1979 |
| JP | 2001-275908 A | 10/2001 |
| WO | WO 9944254 | 9/1999 |
| WO | WO 0029535 | 5/2000 |
| WO | WO 2004 094906 A2 | 11/2004 |

OTHER PUBLICATIONS

International Search Report, mailed Feb. 14, 2007.
English language abstract of Japanese Patent No. JP54058954, published May 12, 1979.
Pacific Northwest National Library paper entitled "Microheater" ca. Jul. 21, 1999, by Drost et al.

* cited by examiner

MICRO POWERED FLOOR CLEANING DEVICE

BACKGROUND OF THE INVENTION

A variety of carpet cleaners, mops and sweepers are used for cleaning various walking surfaces. A conventional carpet cleaner suffers from at least two drawbacks. First, the carpet cleaner tends to be bulky to accommodate a conventional motor to drive a carpet cleaner head and for housing a large container of a chemical cleaning solution. Second, the carpet cleaner typically is plugged into an electrical outlet via an electrical cord, which restricts movement of the carpet cleaner.

A conventional mop or sweeper also suffers from a number of limitations. The mop or sweeper may employ a chemical cleaning solution in a pre-moistened wipe or as a spray applied from a container attached to the mop or sweeper. However, many consumers disfavor a chemical-based cleaning solution for cleaning walking surfaces due to concerns that the chemicals may be harmful to small children, pets and the like. If water, either heated or in the form of steam, is substituted for the chemical cleaning solution, the mop or sweeper must use an electrical cord plugged into an electrical outlet to heat the water to facilitate cleaning, which severely restricts movement of the mop or sweeper. Likewise, a conventional mop and hot water bucket combination suffers from problems such as progressively dirtier water as the walking surface is mopped. Moreover, the dirty water tends to slosh out of the water bucket as the water bucket is moved about to mop the walking surface.

A floor-cleaning device is needed in the industry, which utilizes a compact, portable power source that enables a user to move the floor-cleaning device easily about a floor during cleaning.

BRIEF SUMMARY OF THE INVENTION

The present invention generally provides micro powered floor cleaning equipment such as mops, sweepers, carpet cleaners and the like. The floor cleaning equipment utilizes a micro power source that facilitates portability of the floor-cleaning equipment by eliminating electrical power cords in some embodiments and bulky motors in other embodiments to provide electrical power to various cleaning devices of the floor-cleaning equipment. In still other embodiments, the micro power source generates heat to deliver heated water or steam to clean dirty floors or carpets. The component parts of the micro powered floor-cleaning device are simple and economical to manufacture, assemble and use. Other advantages of the invention will be apparent from the following description and the attached drawings, or can be learned through practice of the invention.

As used herein, the term "solution" means a liquid that can include water, cleaning agents, fragrance additives and the like.

As used herein, the term "micro power sources" are devices that convert a fuel (typically a liquid such as methanol) into energy via a reaction with oxygen either by electrochemical routes to produce electricity for resistive heating or by chemical routes (e.g., combustion or direct oxidation) to release thermal energy. Micropower sources can include any type of micro-fuel cell, micro-gas turbine (micro engine), microheater or their combinations, which may, for example, deliver 10 to 100 times as much energy as conventional lithium ion batteries occupying the same volume. For instance, the micro power sources may deliver power to devices of the present invention from about 0.2 Watts (W) to 2000 W, more particularly from about 0.5 W to about 200 W.

The micropower source need not produce electricity, but, some versions of the invention may be other power sources capable of generating thermal energy from a fuel, and also capable of user control to turn on or shut off power production at will, unlike, for example, iron-based exothermic reaction systems used in commercial hand warming pads and other products. In some embodiments described herein, the user can also adjust a setting to control the rate at which energy is produced from the fuel. If the energy is heat, a workpiece can be heated directly. If the energy produced is electricity, the electricity can be used for resistive heating or to activate the workpiece. Of course, when electricity is produced, a portion of the energy produced by the fuel will be released as waste heat, which can be captured and utilized in various aspects of the invention.

Further, the "micro power sources" according to various aspects of the present invention can be readily rechargeable by simply adding fuel to an empty fuel cartridge or replacing a spent fuel cartridge as will be described in detail in the following discussion.

More specifically, the micro-fuel cells according to various embodiments described herein are devices that electrochemically oxidize a fuel to generate electricity. Exemplary methods of coupling micro-fuel cells with portable electrical devices are described and shown, for example but without limitation, in U.S. Pat. No. 6,326,097 to Hockaday, which is incorporated herein by reference.

The micro-gas turbines contemplated in various embodiments herein generally include a miniature compressor that compresses incoming air to high pressure, a combustion area that burns the fuel and produces high-pressure, high-velocity gas, and a tiny turbine that extracts the energy from the high-pressure, high-velocity gas flowing from the combustion chamber, which is then converted to electricity. Examples of microturbines that convert fuel to electricity are found in U.S. Pat. No. 5,932,940 to Epstein et al. and U.S. Pat. No. 6,392,313 to Epstein et al., which are incorporated herein by reference without limitation.

The microheater used in various embodiments described herein is a microscale heating system that can be used for personal or portable heating and cooling devices. The microheater has the capability of producing up to 30 W of thermal energy per square centimeter of external combustor area and can heat a portable heater, for instance, for as long as eight hours on minimal fuel. Exemplary microheater applications are described by Drost et al. in a Pacific Northwest National Laboratory paper entitled *MicroHeater*, ca. Jul. 21, 1999, which is incorporated herein and without limitation by reference thereto.

Another example of fuel cell technology, which can be used in various embodiments of the present invention is a hydrogen-based fuel cell system, which is available for instance but without limitation from Angstrom Power Solutions (North Vancouver, British Columbia, Canada). Such a system is described, for example, in U.S. Pat. No. 6,864,010 to McLean, which is incorporated by reference. The hydrogen-based fuel cell system uses compressed hydrogen gas in cartridges or metal hydride storage systems. A proton exchange membrane with a porous diffusion material and catalyst generates electricity from the reaction of oxygen and hydrogen, with an optional hybrid battery connected to the fuel cell. The fuel cell can be cylindrical, as in the shape of existing AA lithium batteries, or can have a prismatic shape. For example, an Angstrom V50 cylindrical fuel cell is 2.6 cosmetic in diameter and 2 cm long, producing 1 W at 5 volts.

A V60 fuel cell is a prismatic fuel cell with dimensions of 5 mm×27 mm×19 mm. As presented at the 7th Annual Small Fuel Cell 2005 Conference, Washington, D.C., Apr. 27-29, 2005, Angstrom fuel cells may deliver energy of 700 Whr/liter or 170 Whr/kg at 50% net efficiency.

With particular reference to the micro-fuel cell form of a micro power source, the micro-fuel cell generates and delivers electrical power to cleaning devices very efficiently. It is also important to note that the invention uses fuel to generate energy in a controlled manner, which will broaden the capability of the micro-fuel cells. The significance of this concept is that the fuel can either generate electricity that is then used to create heat, or the fuel can directly produce heat without first creating electricity. The fuel is capable of doing so by controlled oxidation in the presence of catalysts, creating energy used by electricity for resistive heating, or direct generation of heat from oxidation of the fuel. When electricity is used, a significant portion of the energy value of the fuel will still be released as waste heat.

The micro-fuel cell can be but is not limited to a polymer electrolyte membrane (PEM) cell, a direct methanol cell (DMFC—a form of PEMFC discussed below), a phosphoric acid cell, an alkaline cell, a molten carbonate cell, a solid oxide cell, and a regenerative (reversible) micro-fuel cell. Other types of micro-fuel cells may include small MEMS (micro electrical machined system) devices, which are also suitable for electrical power applications. The MEMS-based fuel cell can be a solid oxide type (SOFC), a solid polymer type (SPFC), or a proton exchange membrane type (PEMFC). Each MEMS micro-fuel cell can have an anode and a cathode separated by an electrolyte layer. Additionally, catalyst layers can also separate the electrodes (cathode and anode) from the electrolyte as discussed below.

By way of more specific example, the PEM micro-fuel cells use a membrane to separate the fuel from the oxygen. A catalyst such as platinum may be present on, in, or otherwise associated with the membrane to help generate hydrogen ions from the fuel in the presence of an electrochemical circuit that receives an electron as a hydrogen ion is generated. The membrane, typically wetted with water, allows hydrogen ions from the fuel to diffuse toward the oxygen where it reacts electrochemically. The overall reactions involved may be, in the case of methanol fuel cell:

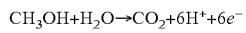

$CH_3OH + H_2O \rightarrow CO_2 + 6H^+ + 6e^-$

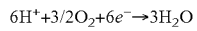

$6H^+ + 3/2 O_2 + 6e^- \rightarrow 3H_2O$

The flow of electrons across the circuit occurs at a voltage that can be used to conduct useful work; i.e., to power cleaning devices as described herein.

By way of further example but not of limitation, a micro-fuel cell in another aspect of the invention can be made from two silicon substrates. Porous silicon is formed along the surface of the substrate in a desired pattern provided by a mask. Suitable mask materials include those that do not dissolve in HF, e.g., silicon nitride, gold and chromium. Ambient mask conditions are next changed to provide electropolishing to form gas delivery tunnels or channels underlying the porous regions. A variety of patterns are suitable for these tunnels or channels such as serpentine, parallel, wheel and spoke or fractal patterns. The mask provides a final structure in which the porous silicon regions are supported, typically by portions of the mask itself. The resulting structure provides porous silicon regions formed in the surface of the substrate, with underlying tunnel regions formed within the substrate.

In this exemplary micro-fuel cell, two silicon current collector/gas diffusion structures are prepared as described above. A catalyst layer is then formed on each silicon structure (on the surface in which the porous silicon regions are formed) for both electrodes. The catalyst layer is formed by any suitable technique, e.g., sputtering or spinning an emulsion of catalyst particles. The catalyst layer can be, for example, platinum or platinum/carbon (e.g., carbon particles having attached platinum particles). Additionally, a platinum/ruthenium catalyst is useful for reacting with methanol fuel, although the Pt—Ru is generally only used for the catalyst layer in contact with the fuel, with a different catalyst used on the oxidant side of the cell. The catalyst layer is electrically conductive (i.e., at least 1 ohm$^{-1}$ cm$^{-1}$) and is in electrical contact with the silicon current collector.

On one of the foregoing substrates, a proton exchange membrane is formed on the catalyst layer. As used herein, the term "proton exchange membrane" indicates any suitable material that allows ions to conduct across it. Forming the proton exchange membrane encompasses in situ techniques such as spin or solution casting, as well as providing a pre-formed film onto the catalyst. An exemplary membrane for use in this construction is the Nafion® brand membrane sold by the Dupont® company. Specifically, the Nafion® brand membrane is a perfluorosulfuric acid membrane with a polytetrafluoroethylene backbone.

Those skilled in the art will appreciate that other films are commercially available and suitable for use as the membrane. For example but not by way of limitation, modified Nafion® brand membranes can be obtained by treatment with electron beams or chemical modification (e.g., addition of a polybenzimidazole layer applied with screen printing or other printing techniques). The membrane can also contain exfoliated clays or hydrocarbons.

The selected membrane is next formed on the catalyst layer by liquid phase techniques, e.g., spin casting or solution casting, or by assembly of a pre-cast film. The membrane thickness ranges from about 10 to about 50 μm. In the case of a pre-cast film, the catalyst material is generally painted onto the film, e.g., as an ink containing the catalyst, alcohols, and the membrane polymer.

It should be understood that there is no well-defined boundary between the catalyst layer and the membrane. For example, in the case of spin or solution casting, the catalyst layer surface generally has some texture, and casting of the membrane layer on such a textured surface causes the ionically conducting polymer to move into such textured regions, e.g., into local valleys of the catalyst layer. Painting a catalyst material onto a pre-cast membrane provides a similar result.

To finish forming the micro-fuel cell, one of the above-described electrode structures is placed on the other electrode structure such that the catalyst layer of the second substrate contacts the proton exchange membrane. Generally, a PTFE or solubilized form of the proton exchange membrane is used to bond the catalyst layer to the membrane, followed by a heat treatment to drive off alcohol and solvents.

As constructed above, the micro-fuel cell operates as follows: fuel, e.g., hydrogen or methanol, is introduced into the first current collector (the anode) by directing the fuel through the tunnels such that it diffuses through the porous gas-diffusion regions to the catalyst layer. The catalyst layer promotes formation of hydrogen ions from the fuel, releasing electrons. The electrons flow from the catalyst layer through the anode current collector and through an external circuit, while the hydrogen ions (i.e., protons) move across the membrane toward the second catalyst layer (the cathode catalyst).

In this micro-fuel cell, an oxidant, e.g., air or oxygen, is directed into the tunnels of the cathode current collector, and diffuses through the gas-diffusion porous regions to the second catalyst layer. At this second catalyst layer, oxygen from the oxidant reacts both with the hydrogen ions flowing across the membrane and with the electrons flowing to the catalyst layer from the external circuit to form water. As noted above, this electron flow provides the desired current, and the water by-product is removed from the cell.

With reference now to the direct methanol fuel (DMFC) cell briefly introduced above, an exemplary DMFC cell includes a 13 W fuel cell operating at 15V that can operate for about 10 hours on approximately 100 ml of fuel. Another exemplary DMFC is thumb-sized: about 22 mm×about 56 mm×about 4.5 mm with 1.6 g of methanol fuel in its tank and has an overall mass of about 8.5 g. This micro-fuel cell provides about 20 hours of power at 100 mW for operation of, for example, a heating device using just 2 cc of fuel.

By way of further example, an active micro-fuel cell can provide 1 W of power for about 20 hours with approximately 25 cc of fuel. With the 25 cc methanol fuel cartridge in place, its weight is only about 130 g, with a size of about 100 mm×about 60 mm×about 30 mm (about 140 cc volume). This is equivalent to 6 lithium-ion batteries (3.7V and 600 mAh) that are currently used, for instance, in cellular phones By way of further example, Los Alamos National Laboratory (LANL) at Los Alamos, N.M. has developed micro-fuel cells such as a 100 $cm^2$ fuel cell for the U.S. Department of Energy and a 19.6 $cm^2$ fuel cell (250 g, 340 W/kg, 25 W nominal and 75-85 W peak power).

Many of the foregoing exemplary micro-fuel cells can use a variety of fuels, e.g., ethyl alcohol, methanol, formic acid, butane, or other fuel sources to produce electrical power. The skilled artisan will instantly recognize that the fuels need not be methanol or other volatile fuels, but can also be non-volatile fuels such as non-volatile borohydride-alkaline solutions combined with alcohols such as those provided by Medis Technologies of New York City, N.Y.

A variety of solid oxide fuel cells (SOFCs) can also be used as the micro-fuel cells. In an SOFC, a solid oxide electrolyte is used in combination with a compatible anode and a cathode material. Such an SOFC generates electricity and heat by directly converting the chemical energy of a fuel (hydrogen, hydrocarbons) with an oxidant ($O^2$, air) via an electrochemical process. The SOFC makes use of the property of certain solid-state oxide electrolytes to support a current of oxygen anions; for example, stabilized zirconia or related oxygen-ion conductors.

Also in the SOFC, the electrolyte membrane separates the fuel and oxidant with the cathode side in contact with the oxidant and the anode side in contact with the fuel. Oxygen from the oxidant stream is reduced to $O^{2-}$ anions at the cathode. These anions are transported through the solid electrolyte to the anode side of the cell. At the anode, the $O^{2-}$ ions are reacted with the fuel stream thus releasing electrons to flow back to the cathode. A secondary device in accordance with certain aspects of the present invention can be inserted into the circuit between the anode and cathode to draw useful work from the flow of electrons generated.

In addition to the above-described micro-fuel cells, other fuel cell technologies are suitable for use in various embodiments of the present invention. For example, a methanol fuel cell is available from CMR Fuel Cells, Ltd. of Harston, Cambridge, United Kingdom, which does not require the flow plates used by some fuel cells to keep the fuel and the oxygen separated (compare SOFC above); i.e., the CMR fuel cell allows operation with mixed fuel and oxygen. Yet other suppliers of micro-fuel cells include Smart Fuel Cell GmbH of Germany, Samsung of South Korea and Microcell of Raleigh, N.C. In particular, the Microcell-PE methanol fuel cells are useful for powering portable devices requiring sub-watt to 100 W power.

In light of the above exemplary micro power sources, according to a particular aspect of the invention, a floor-cleaning apparatus includes a cleaning head with a cleaning device; a control handle connected to the cleaning head for controlling the cleaning head; and a micro power source in communication with the cleaning device. In this aspect, the cleaning device can be a steamer in communication with the micro power source. The steamer heats a solution held in a reservoir. Specifically, the solution is heated using the electricity generated by the micro power source to produce a steam. The cleaning device directs the steam from the steamer onto a floor for cleaning the floor.

The micro power source in this aspect of the invention includes a fuel source and a chamber in communication with the fuel source. The chamber generates the electricity from a fuel communicated from the fuel source to power the cleaning device such as the steamer. Alternatively, or in addition to the steamer, the cleaning device can be an ultrasonic plate in communication with the micro power source. The ultrasonic plate, which is similar in some ways to the device of U.S. Pat. No. 6,376,444 to Hortel et al. incorporated herein by reference, produces a plurality of vibrations using the electricity generated by the micro power source, the cleaning device being configured to direct the vibrations from the ultrasonic plate in a direction of a floor to dislodge a plurality of foreign particles from the floor.

Also in the present aspect of the invention, the control handle of the floor-cleaning apparatus is swivably connected to the cleaning head by a swivel assembly. The swivel assembly is similar in some ways to that of the SWIFFER® brand device. In this example, the swivel assembly permits a user to change a direction of movement of the cleaning head by simply swiveling the control handle about the cleaning head without needing to lift the cleaning head from the floor.

The control handle can also include a power switch electrically connected to the micro power source. The power switch is used to selectively activate the micro power source. The power switch can be a conductivity contact for activating the micro power source by a user touch. When the user releases the conductivity contact, the micro power source is deactivated.

Further, in this aspect of the invention, the micro power source is a fuel cell with a fuel cartridge located near or attached to the chamber for holding the fuel. The chamber is a reaction chamber that receives the fuel from the fuel cartridge to generate the electricity from an oxidation of the fuel in order to power the cleaning device. In this aspect, the oxidation generates about 0.2 W to about 200 W for powering the cleaning device. Also in this aspect, the oxidizing fuel can generate a waste heat. A supply of volatile fragrance solution is supplied in this aspect, which can be heated by the waste heat to evaporate or chemically react to deliver an aroma into a room as the floor is being cleaned.

The fuel cartridge in this aspect of the invention is either refillable with a replacement supply of fuel, or can be a replaceable fuel cartridge, which can be replaced in its entirety when the fuel is depleted.

Also in this aspect of the invention, a vacuum is provided, which includes a hose with a bag connected to the hose. The vacuum has a vacuum port in communication with a floor and the hose. A filter such as an electrostatic filter is positioned between the vacuum port and the hose.

Further in this aspect, a motor and a beater bar are included. The beater bar has a plurality of brushes and is powered by the motor. As the motor drives the beater bar, the brushes are rotated, swept side to side or otherwise moved to clean the floor.

The floor cleaning apparatus in the present aspect can also include a reservoir for holding a fluid such as a quantity of water, a quantity of cleaning solution, a quantity of fragrance solution and any combinations of the foregoing. A control mechanism such as a button is also provided in this aspect for the user to selectively spray the water, the cleaning solution, the fragrance or their combinations.

In another embodiment of the invention, a floor cleaning apparatus includes a cleaning head with a cleaning device; a control handle connected to the cleaning head for controlling the cleaning head; and a micro fuel cell in communication with the cleaning device. The cleaning device in this aspect can be a steamer electrically connected to the micro fuel cell. The steamer heats a solution from a reservoir using the electricity generated by the micro fuel cell to produce a steam. The cleaning device directs the steam from the steamer onto a floor for cleaning the floor.

In this aspect, the micro fuel cell includes at least one fuel cartridge having a quantity of fuel disposed therein and a reaction chamber in communication with the fuel cartridge. The reaction chamber generates electricity from an oxidation of the fuel to power the cleaning device. Also in this aspect of the invention, an intake member is located adjacent the reaction chamber to protect the reaction chamber from the solution or fluid.

Alternatively or in addition to the steamer, the cleaning device in this aspect can include an ultrasonic plate electrically connected to the fuel cell. The ultrasonic plate produces a plurality of vibrations using the electricity generated by the fuel cell, and the cleaning device directs the vibrations from the ultrasonic plate in a direction of a floor to dislodge a plurality of foreign particles from the floor, such as dust, dirt, lint, dried food particles and the like.

In yet another aspect of the invention, a floor cleaning apparatus includes a cleaning head having a cleaning device; a control handle connected to the cleaning head for controlling the cleaning head; and a microturbine engine in communication with the cleaning device. In this aspect, the cleaning device can be a steam, an ultrasonic plate or the like. The microturbine engine generates electricity to power the cleaning device.

The control handle can have a power switch electrically connected to the microturbine engine to selectively activate the microturbine engine. In this aspect, the power switch can be a conductivity contact for activating the microturbine engine by a user touch. When the user releases the conductivity contact, the microturbine engine is deactivated.

In this aspect of the invention, the microturbine engine includes a plurality of diffuser vanes and a plurality of compressor blades. The plurality of compressor blades rotates about the diffuser vanes to generate the electricity. More particularly, a fuel cartridge holds a supply of fuel, which a chamber receives. The fuel is combusted in the chamber, which rotates the compressor blades in response to a combustion gas generated by the combusted fuel.

Other aspects and advantages of the invention will be apparent from the following description and the attached drawings, or can be learned through practice of the invention.

BRIEF DESCRIPTION OF THE DRAWINGS

The above and other aspects of the present invention will be apparent from the detailed description below and in combination with the drawings in which.

DETAILED DESCRIPTION OF THE INVENTION

Figure 1:
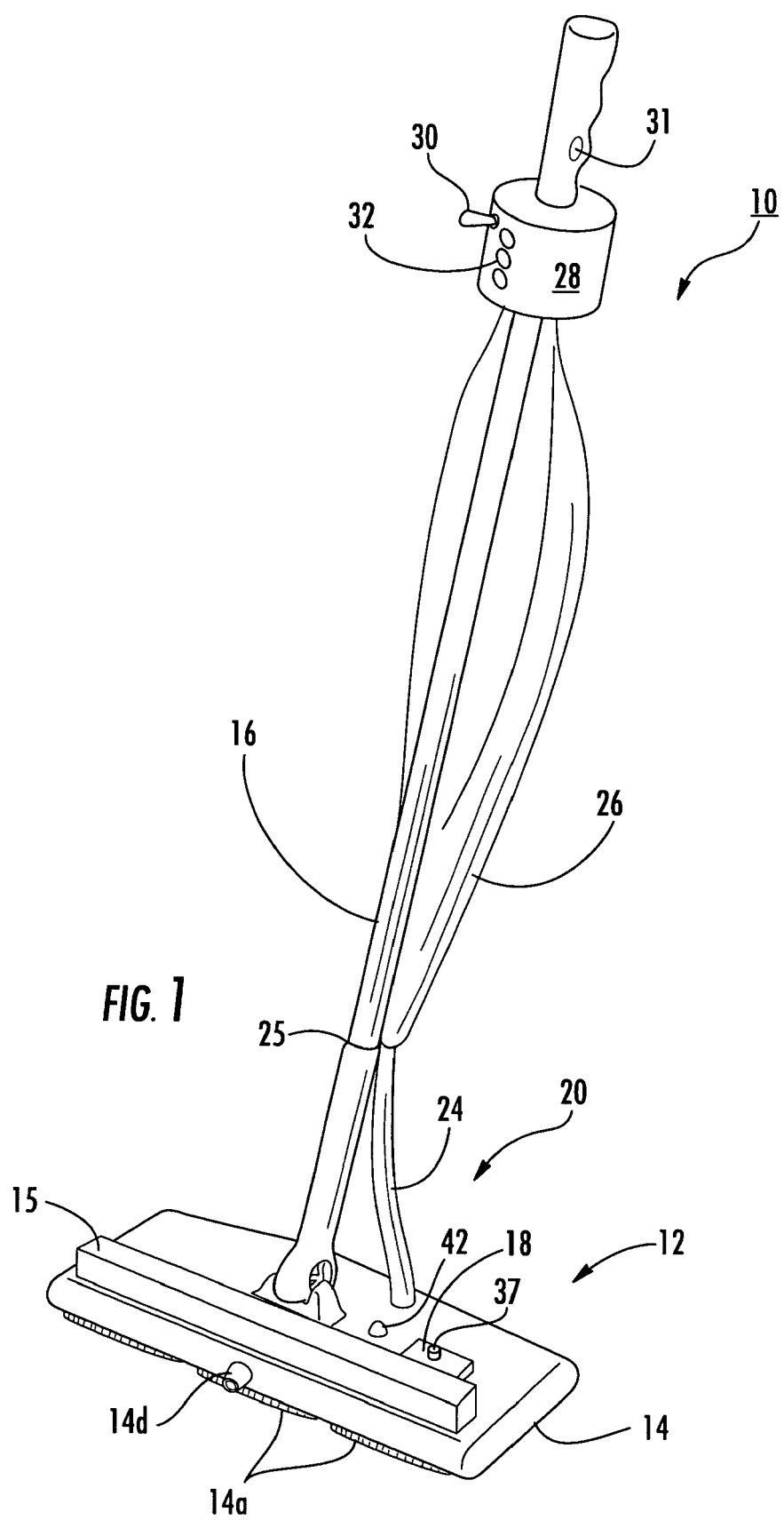
FIG. 1 is a perspective view of floor-cleaning apparatus according to one embodiment of the invention.

Detailed reference will now be made to the drawings in which examples embodying the present invention are shown. The detailed description uses numerical and letter designations to refer to features of the drawings. Like or similar designations in the drawings and description have been used to refer to like or similar parts of the invention.

The drawings and detailed description provide a full and detailed written description of the invention and the manner and process of making and using it, so as to enable one skilled in the pertinent art to make and use it. The drawings and detailed description also provide the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

As broadly embodied in the figures, a floor cleaning apparatus employs a micro power source for powering various cleaning devices used with the floor cleaning apparatus. The cleaning devices are used to clean surfaces such as carpets, hardwood flooring, tiles and other walking surfaces. The skilled artisan will instantly recognize that the cleaning devices and other components of the floor cleaning apparatus including their materials, combinations and dimensions, which are described in detail below, are modifiable to accommodate various cleaning requirements and are not limited to only those examples shown in the figures.

As shown in FIG. 1, a first embodiment of a floor-cleaning apparatus is designated in general by the element number 10. The floor-cleaning apparatus 10 broadly includes a cleaning head 12, a control handle 16 (alternatively, arm or body) and a micro power source 18. As described in detail below, the micro power source 18 is a portable source of electricity for powering various cleaning devices attached to the cleaning head 12.

Figure 2:
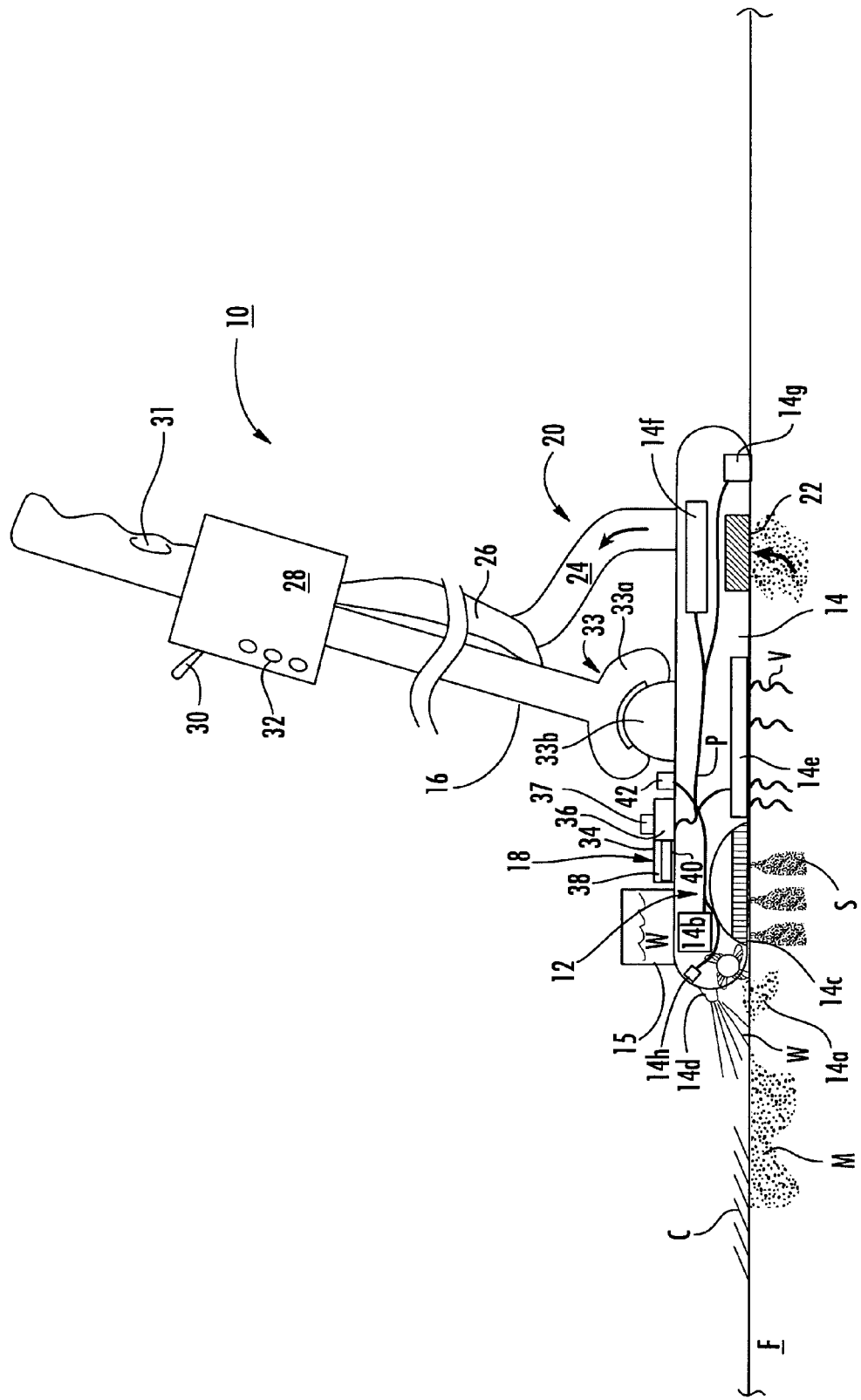
FIG. 2 is an elevational view of the floor-cleaning apparatus as in FIG. 1 showing a cleaning device powered by a micro power source according to one embodiment of the invention.

With reference to FIGS. 1 and 2 the cleaning head 12 more particularly includes a cleaning device 14, which is used in this aspect of the invention to clean a floor F or carpet C. For instance, the cleaning device 14 can include a beater brush 14A rotatably attached to the cleaning head 12 for agitating and loosening foreign matter such as dirt, dust, lint, pet hair, particulates and the like, generally designated by the letter M, which may be situated in or on the carpet C. Alternatively, the beater brush 14A may vibrate or oscillate in any manner other than complete rotation and may, for example, be driven by piezoelectric vibration at various frequencies sufficient to dislodge the foreign matter M.

As shown most clearly in FIG. 2, the cleaning head 12 can include a heating element 14B, which is electrically connected to the microfuel cell 34 by an electrical connection or power line P. As shown, the heating element 14B can be used to heat a cleaning solution such as water W, which is stored in a solution reservoir 15. The heating element 14B heats the solution W and can deliver the heated solution W in the form of steam S, which is released through a steamer 14C also attached to the cleaning device 14. Alternatively, or in addition to the steamer 14C, a spray nozzle or sprayer 14D can be attached to the cleaning device 14 in communication with the solution reservoir 15 and/or the heating element 14B for spraying the heated solution W onto the floor F.

FIGS. 1 and 2 further show that the control body 16 can include a motor 28 in electrical communication with, for instance, the beater brush 14A or a vacuum 20 to power the beater brush 14A, the vacuum 20 and other components. As shown, the control body 16 can include an on/off switch 30, which can be used to activate the motor 28. Alternatively, a user exerting pressure on the cleaning head 12 through the handle 16 could activate the motor 28. Moreover, the on/off switch 30 may be a conductivity contact to activate the microfuel cell 34. Alternatively, or in addition to the on/off switch 30, a printable conductive ink contact 31 can be provided for hand actuation of the microfuel cell 34 and thus the cleaning device 14. In this aspect of the invention, the contact 31 can prevent power drain of the microfuel cell 34 since human contact is required to maintain activation of the microfuel cell 34 when using the contact 31. Such contact also alleviates safety concerns since the cleaning device 14 will not be powered without human contact.

The micro power source 18 shown in FIGS. 1 and 2 includes a microfuel cell 34, which has a combustion or electrochemical reaction chamber 36 and a fuel cartridge 38 for storing a quantity of fuel 40. Although shown relatively horizontal in this example, the fuel cartridge 38 may be disposed at a higher elevation than the reaction chamber 36 during normal use in order to permit gravitational feed of the fuel 40 to the reaction chamber 36, if desired. Alternatively, micro pumps, capillary pressure, or other devices and methods may be used to deliver the fuel 40 in other embodiments.

FIG. 2 also shows a vibrator or ultrasonic plate 14E, which is connected to the microfuel cell 34 by the electrical line P. As shown, the ultrasonic plate 14E can be powered by the microfuel cell 34 to induce energy or vibrations V that can be used to dislodge the foreign matter M from the floor F or the carpet C. The plate 14E can operate at an ultrasonic frequency or lower frequencies having a drive using piezoelectric or electrically driven mechanical shakers. By way of example and without limiting the present invention, U.S. Pat. No. 4,728,843 to Mishiro describes vibrator plates, which can be used as the plate 14E.

More particularly, the ultrasonic plate 14E can be a resonator having a watertight, welded stainless steel housing as shown in which a number of piezo-horns 17 (e.g., lead, zircon, titanate) are mounted near the floor F to produce the vibrations V at a desired output; e.g., in frequency ranges of 25, 40 and 132 kHz. The skilled artisan will instantly recognize that piezo-horns 17 can be mounted in a variety of ways, for example, built in the housing, attached to a diaphragm in the housing, or suspended with mounting hooks and a V4A tube or the like. As shown, the vibrations V radiate from the piezo-horns 17 onto the floor F. After the vibrations V from the ultrasonic plate 14E dislodge the foreign matter M, the foreign matter M can be vacuumed more easily by the vacuum 20.

As shown in FIGS. 1 and 2, the vacuum 20 includes a vacuum port 22 defined in the cleaning device 14. More particularly, the vacuum port 22 is connected to a hose 24, which is also connected to a vacuum bag 26. An electrostatic filter 14F is positioned between the vacuum port 22 and the hose 24 and is also connected to the microfuel cell 34 by the electrical line P. Thus, as the vacuum 20 is operated, the electrostatic filter 14F purifies the ambient air being drawn into the vacuum bag 26 as indicated by the bold arrows in FIG. 2.

Also shown in FIG. 2, an ionizer 14G can be connected to the microfuel cell 18 and located next to the vacuum port 22. As the vacuum 20 is being used, the ionizer 14G will emit negative ions, which collide with ambient airborne molecules being drawn into the vacuum port 22. The negative ions from the ionizer 14G give up their negative charge to create negative molecules, which are attracted to surrounding positive molecules in the ambient air. The accumulation process continues until the particles M become heavy enough to fall to the floor F and are vacuumed by the vacuum 20 through the vacuum port 22. Thus, the ionizer 14G removes small pollutants that can harbor toxic chemical and disease organisms.

FIGS. 1 and 2 further show that the control body 16 includes a plurality of mechanisms 32 (alternatively, buttons or switches), which are in communication with any of the foregoing components to selectively control the components. For instance, the mechanisms 32 can be used to selectively inject a fragrance additive into the solution W before spraying the solution W onto the floor F, or for illuminating a light source 14h powered by the power source 18, which can be useful to illuminate dark corners while cleaning.

As shown in FIG. 1, the floor-cleaning apparatus 10 includes a swivel assembly 33 connecting the cleaning head 12 to the control body 16. The swivel assembly 33 includes a swivel 33A and a complementary head 33B, which cooperate to allow a user to swivel the control body 16 relative to the cleaning head 12 to change directions of the floor-cleaning apparatus 10. The swivel assembly 33 and its swivel 33A and head 33B can be a ball-joint, adjustable detent device or the like to position the control body 16 according to the requirement of the user. A snap-in or screw-like assembly 25 can be provided to detach the handle 16 from the cleaning head 12 to be used as a hand-held cleaning device. Further details are not necessary for one skilled in the art to understand and practice these aspects of the invention.

FIGS. 1 and 2 also show a fragrance holder 37, which holds a quantity of fragrance in the form of a solution or emulsion. The fragrance holder 37 is attached on or near the combustion chamber 36 such that the fragrance solution is mixed with a water vapor discharge that emits as a byproduct from the combustion chamber 36 as will be described according to an exemplary operation of the micro-fuel cell 34 below. In this aspect of the invention, the water vapor discharge is leveraged to emit a pleasant smelling aroma into a room as the walking surface F is being cleaned. Alternatively, waste heat from the micro-fuel cell 34 can be used to heat a fragrance solution, which can be in solid, semi-solid, or liquid form, to deliver a selected aroma during operation.

Figure 3:
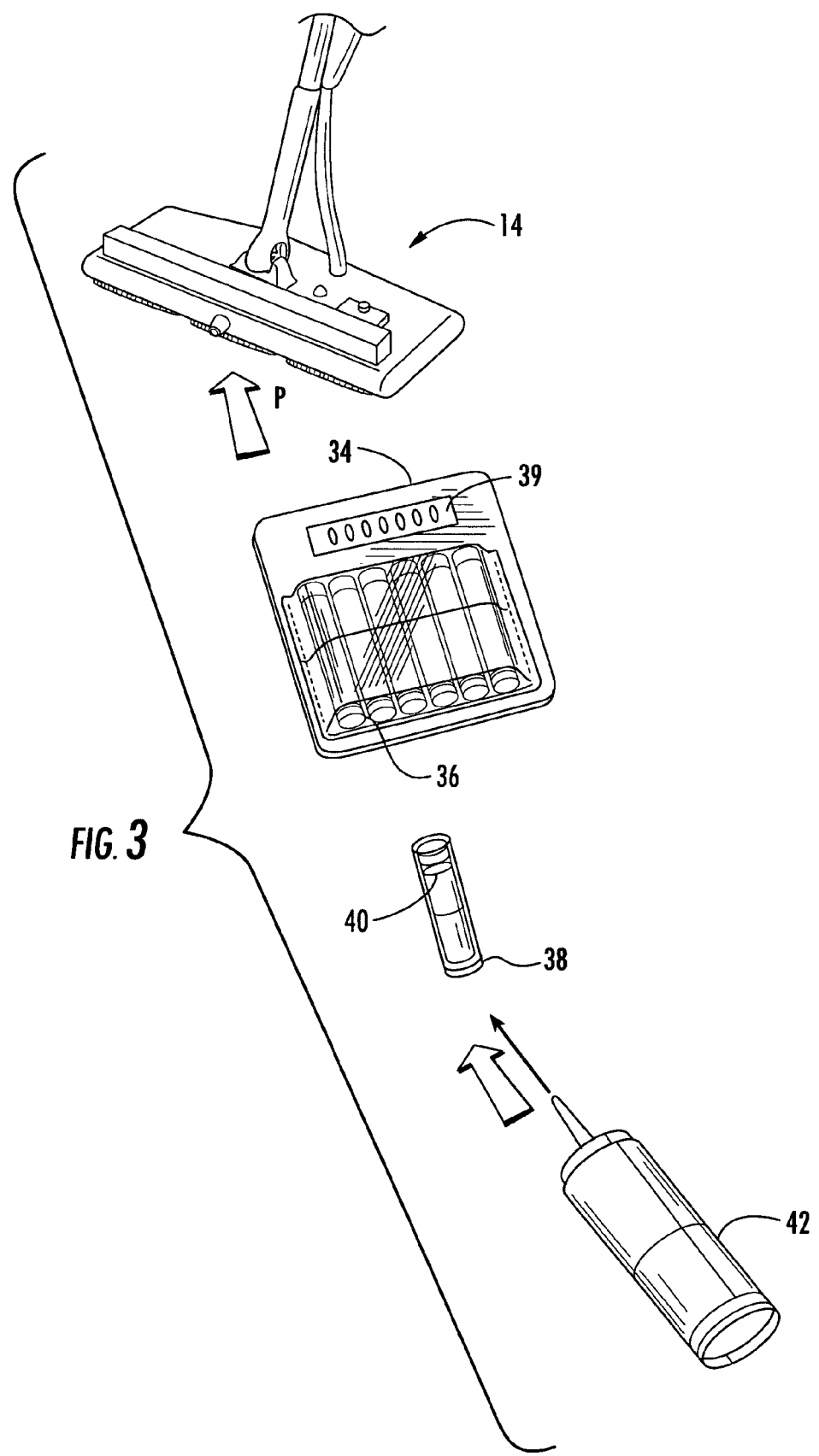
FIG. 3 is an exploded view of a reusable micro power source being inserted in a cleaning device according to an aspect of the invention.

With reference now to FIGS. 2 and 3, the micro-fuel cell 34 can have an air intake 39 to allow air in the atmosphere to be in fluid communication with the internal fuel cell. The air intake 39 can include a gas pervious material such as a fibrous web or other filter, a porous membrane, an apertured solid, a grill, a plurality of slots or other openings in the micro-fuel cell 34. In one aspect, the air intake 39 is provided with a water repellent mechanism, device or coating to prevent the solution W used for cleaning the floors F or carpets C from accidentally flooding the internal fuel cell. For example, the air intake 39 can have a hydrophobic barrier such as a hydrophobic web (woven or nonwoven), an apertured film, a porous membrane, and the like, which are suitable for resisting the in-flow of the solution W. Although the air intake 39 can be on an uppermost surface of micro-fuel cell 34, the skilled artisan will instantly appreciate that the air intake 39 can be positioned along one or more sides or a bottom area of the micro-fuel cell 34, and multiple air intakes having a variety of geometries can be provided. Thus, the invention is not limited to the exemplary air intake 39 as shown in FIG. 3.

FIG. 3 most clearly shows the microfuel cell 34. In this aspect of the invention, the microfuel cell 34 includes the combustion chamber 36, the fuel cartridge 38 and the air intake 39 as briefly introduced above. As shown, the fuel cartridge 38 holds the fuel 40, which upon activation of the on/off switch 30 or the contact 31, for instance, will deliver the fuel 40 into the combustion chamber 36 for combustion. More particularly, the fuel 40 undergoes an electrochemical reaction in which electrons are transferred in a manner to create the electricity as described in greater detail with respect to FIG. 4 below. The electricity is delivered to the various components described above via the electrical lines P. As further shown, the fuel cartridge 38 can be refilled with a subsequent quantity of fuel 40 using a refueling device 42, or the fuel cartridge 38 can be removed and replaced in its entirety with a new fuel cartridge after the fuel 40 is depleted from the original fuel cartridge 38.

Figure 4:
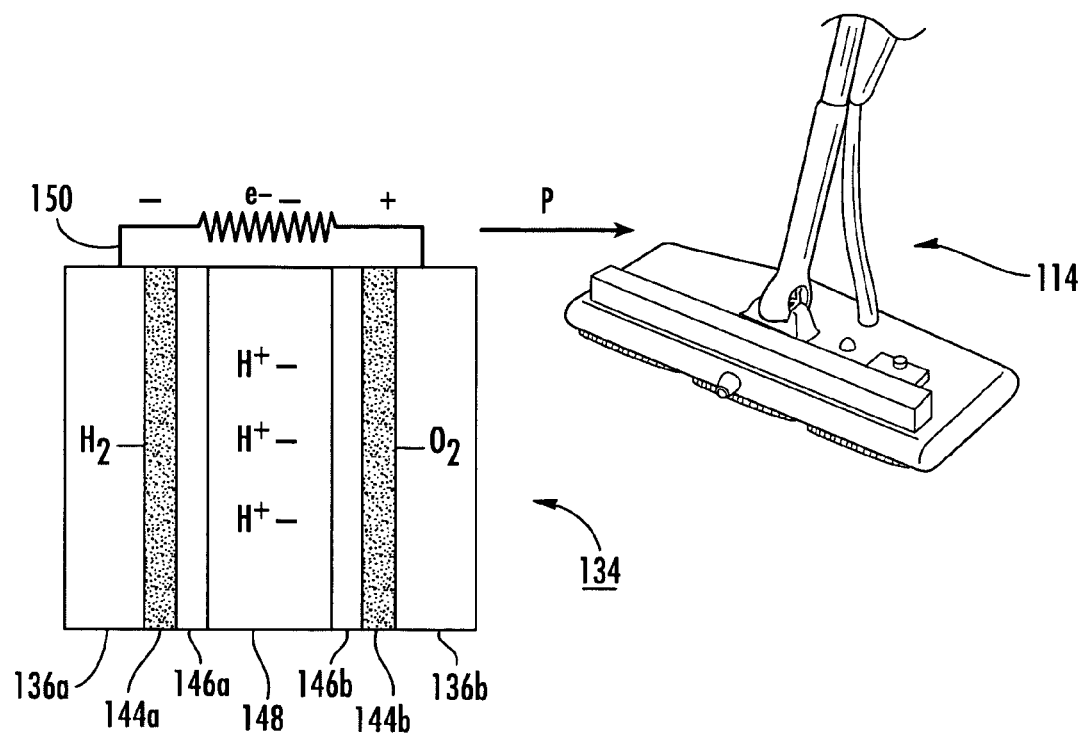
FIG. 4 is a schematic diagram of a micro fuel cell as used in a floor-cleaning apparatus according to an aspect of the invention.

FIG. 4 shows an alternative embodiment of a microfuel cell 134, which can be used to power a cleaning device 114. As shown in this cross-section, the microfuel cell 134 is "sandwiched" together to serve as a gas delivery structure for a fuel, for example, hydrogen gas $H_2$, and for an oxidant (e.g., $O^2$). More particularly, the microfuel cell 134 contains an anode current collector 136A and a cathode current collector 136B, which can both be formed, for instance, from a graphite block with machined paths thereon (not shown) for directing the fuel or the oxidant. In this aspect, graphite cloths 144A,B are provided to allow for gas diffusion from the current collectors 136A,B to a centrally-located proton exchange membrane 148 having catalyst films 146A,B formed on each side of the exchange membrane 148. In this example, platinum is used to form the catalyst films 146A,B.

As indicated in FIG. 4, the hydrogen gas fuel $H_2$ moves through the machined paths in the anode current collector 136A, diffuses through the graphite cloth 144A, and contacts the catalyst layer 146A. The catalyst strips electrons $e^-$ from the fuel $H_2$, and the electrons $e^-$ then travel through an external circuit 150. The remaining positive ions $H^+$ travel through the membrane 148 to the second catalyst layer 146B where they combine with oxygen ions formed when the free electrons $e^-$ travel from the circuit 150 and combine with the oxidant fed through the machined channels of the cathode current collector 136B. One byproduct of this process is electricity generated by the electron flow. Similar to the embodiment above, the electricity in this example is connected to and powers the cleaning device 114 via a power line P. Other byproducts of the process are heat and water. The heat can be recycled with the water to produce a water vapor, which can be combined with the fragrance solution from the fragrance holder 37 for emission into the room, as described above with respect to FIGS. 1 and 2.

Figure 5:
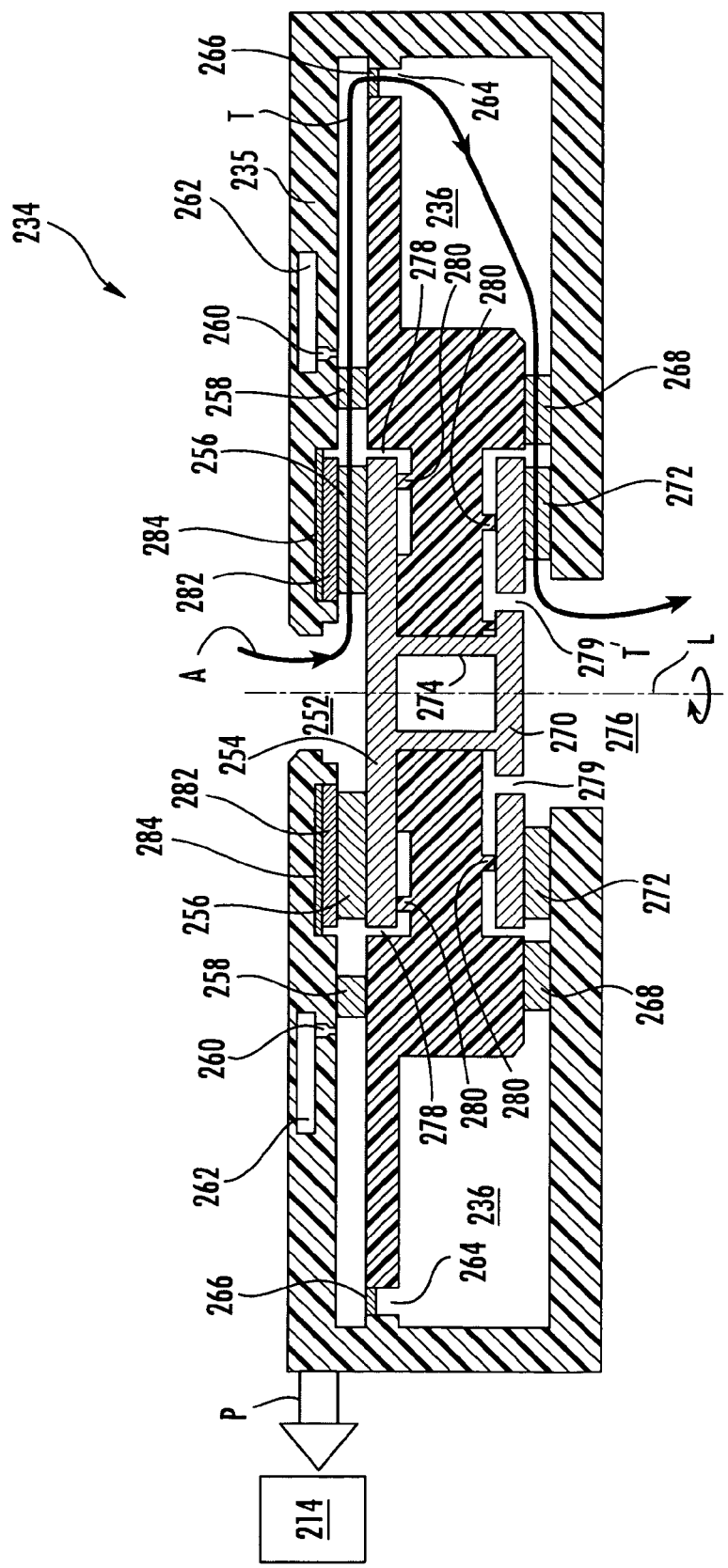
FIG. 5 is a cross sectional, elevational view of a micro power source as used in a floor-cleaning apparatus in accordance with another aspect of the invention.
Figure 6:
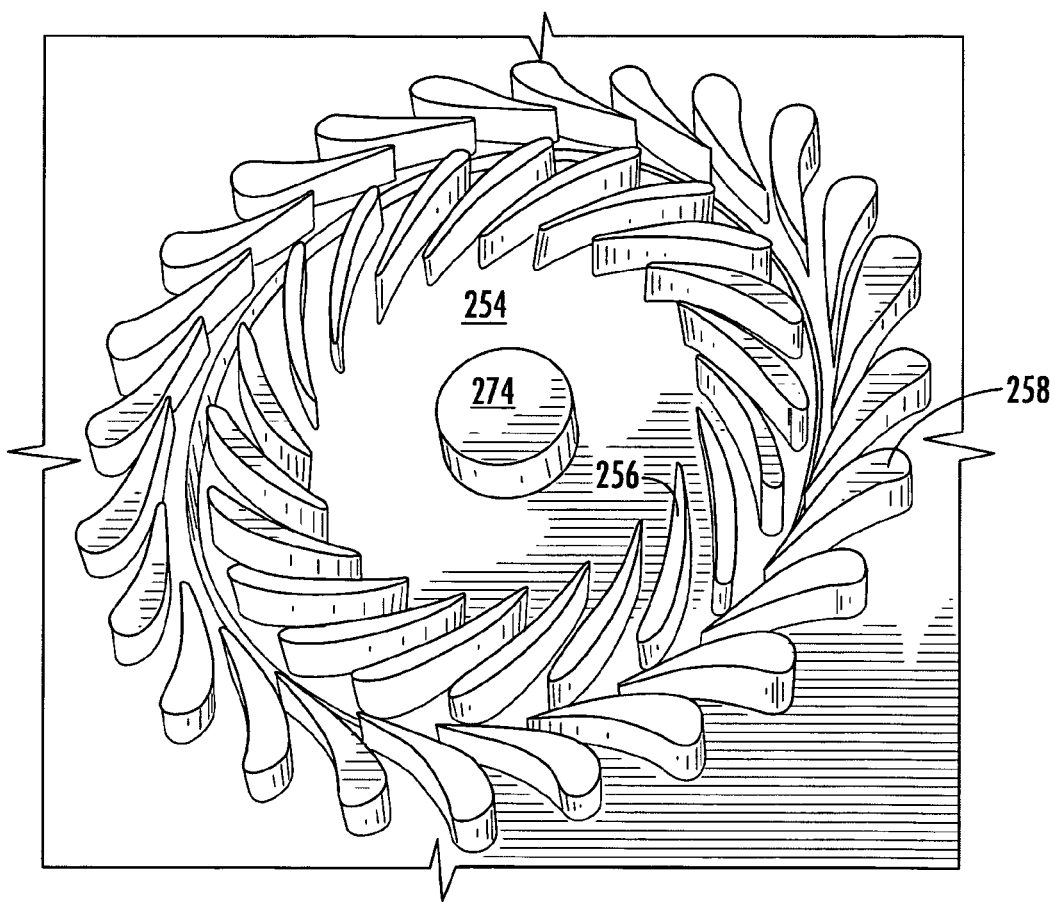
FIG. 6 is a top perspective view of a microturbine as used in the micro power source of FIG. 5.

Turning now to FIGS. 5 and 6, an alternative embodiment of a micropower source used to power a cleaning device 214 is a micro gas turbine engine or microengine 234, which generally includes a plurality of fixed diffuser vanes 258 disposed about a plurality of rotating compressor blades 256. In this example, the micro-gas turbine engine 234 is about 12 mm in diameter and about 3 mm in thickness and employs an air inlet 252 defining an area of about 1 $mm^2$. By way of exemplary operation, air A enters the micro-gas turbine engine 234 along a centerline L defined through the inlet 252. As shown, the air A turns radially outward and is compressed in a centrifugal, planar microcompressor described below. Although only one air path A is apparent in FIG. 5 for clarity, the skilled artisan will appreciate that a continuous air path exists around a circumference of the microengine 234 and through its various components as more clearly shown in FIG. 6.

FIGS. 5 and 6 further show that the microcompressor includes a compressor rotor disk 254 that is approximately 4 mm in diameter in this example and has radial-flow rotor blades 256, which are about 250 micrometers in this example. As shown, the compressor rotor disk 254 is connected to a shaft 274 that is radially journalled for spinning, which in turn spins the compressor rotor disk 254 and the blades 256. Also shown, the plurality of stationary diffuser vanes 258 is located just beyond a radial periphery of the compressor rotor disk 254. Thus, the air A passing through the compressor rotor blades 256 exits the rotor with a large angular momentum that is removed by the vanes 258 in the diffuser and converted to a static pressure rise.

More specifically, fuel (not shown) is injected at the discharge of the compressor rotor disk 254 by way of a fuel injector 260, which is formed of a circular array of, e.g., about 100-200 fuel-metering orifices on the microengine housing 235. As shown, the injected fuel mixes with the air A while flowing radially outward. The fuel injectors 260 are supplied by, e.g., an annular supply plenum 262 that is connected to an external fuel tank such as the fuel cartridge 38 described above.

The air-fuel mixture traverses a diffuser region and then turns (indicated by the letter T) through about 90 degrees to axially traverse a periphery of small holes; i.e., the combustor inlet ports 264 that define flameholders provided in the region between the ports 264. A plurality of combustion igniters 266, e.g., resistive heaters controlled to the auto-ignition temperature of the air-fuel mixture, are located at a number of the combustion inlet ports to initiate combustion of the air-fuel mixture. The ignited mixture axially enters an annular microcombustion chamber 236 where the mixture is fully combusted. In this example, the microcombustion chamber 236 is between about 2 mm-10 mm in annular height and between about 0.5 mm-5.5 mm long measured axially.

FIGS. 5 and 6 show that expanding exhaust gases from the microcombustion chamber 236 are discharged radially inward through stationary turbine guide vanes 268 to a planar radial inflow microturbine rotor disk 270. The turbine rotor disk 270 diameter can be substantially similar to that of the compressor rotor disk 254. Like the microcompressor, the turbine rotor disk 270 includes axial blades 272 similar in height to those of the compressor rotor 254. As shown, the turbine disk 270 is connected by way of the journalled shaft 274 to the compressor disk 254 and thus rotationally drives the microcompressor in response to combustion gases exhausted through the microturbine blades that cause the turbine disk to spin. Specifically, as discussed above, the microturbine is exhausted radially inward where the exhaust gas then turns T' axially, leaving the microengine 234 through an exhaust nozzle 276. Thus, the turbine rotor disk 270 can operate as a micro generator for driving power electronics via a power line P that in turn drive an electrical load such as a cleaning device 214.

Figure 7:
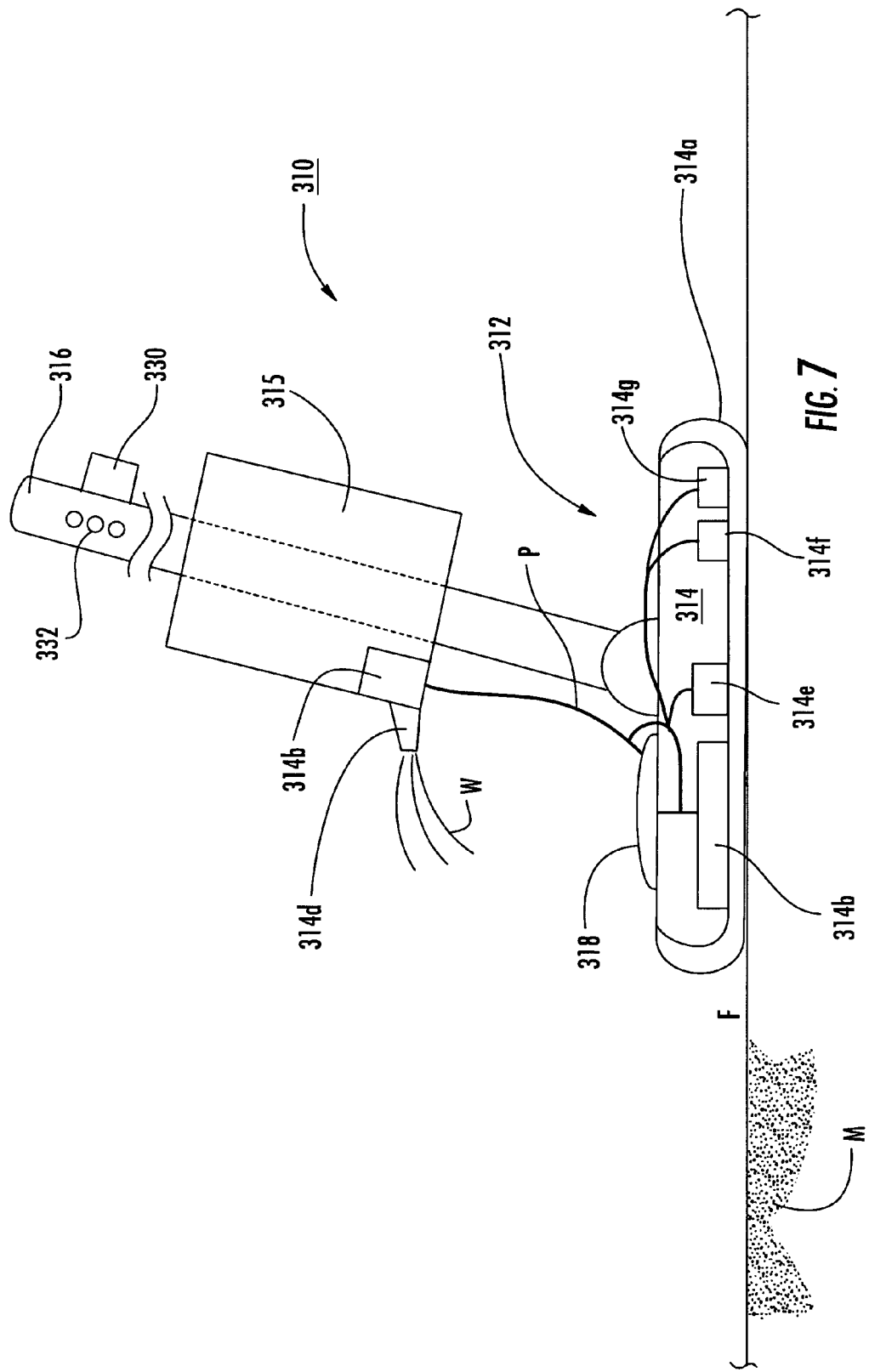
FIG. 7 is an elevational view of a floor-cleaning apparatus according to another embodiment of the invention.

FIG. 7 shows another embodiment of a floor-cleaning apparatus 310 according to another aspect of the invention. Many components of this embodiment are similar to the foregoing embodiments and reference is made to the above-described embodiments to provide a full and enabling description for like or similar components. As shown in FIG. 7, the floor-cleaning apparatus 310 in this aspect of the invention broadly includes a cleaning head 312 connected to a control body 316. The floor-cleaning apparatus 310 also employs a micro power source 318. As shown, a sprayer 314D is connected to a reservoir 315 in which a cleaning solution W is held. A disposable wipe 314A is attached to the cleaning head 312. In this aspect of the invention, the solution W can be sprayed from the sprayer 314D after the solution W has been heated by a heating element 314B. Specifically, the heating element 314B is powered by the micro power source 318, which can be a microfuel cell that produces electricity by way of an electrochemical reaction as described above, or the micro power source 318 can be a microturbine also as described above. Alternatively, the micro power source 318 can be a combination of the microfuel cell and the microturbine. In the latter case, as detailed above with respect to FIGS. 5 and 6, the microfuel cell generates a combustion gas, which powers the microturbine that in turn generates the electricity to power separate components such as the heating element 314B.

As further shown in FIG. 7, the floor cleaning apparatus 310 may include more than one heating element 314B. As shown, one heating element 314B heats the solution W as discussed above, and another is attached to the cleaning head 312 for heating the wipe 314A as the cleaning head 312 moves along the floor F. In this manner, the heated solution W and/or the heated wipe 314A serve to heat and dislodge foreign matter M from the floor F. Additionally, the heated wipe 314A can contain a textured surface to help dislodge the foreign matter M. For instance, dried jelly, ketchup and the like spilled on the floor F can be loosened by the heated solution W and more easily lifted from the floor F by the textured surface of the wipe 314A. After use, the wipe 314A can be discarded and replaced with a replacement wipe.

In this embodiment, those skilled in the art will recognize that additional components may necessarily or optionally be present such as wiring P to connect the micro power source 318 to the various components it powers; mechanisms such as buttons 332 to turn the power on and off, or switches or other devices 330 to control settings and operation of the various components; an LCD panel or other display components to indicate how much fuel is left or when the fuel needs to be recharged; snap-in receptacles to receive the fuel cell, containers to hold spare fuel cell cartridges, etc.

While preferred embodiments of the invention have been shown and described, those skilled in the art will recognize that other changes and modifications may be made to the foregoing embodiments without departing from the spirit and scope of the invention. For example, specific fuels described above and various devices and their shapes and materials and placement can be modified to suit particular applications. It is intended to claim all such changes and modifications as fall within the scope of the appended claims and their equivalents.

That which is claimed is:

1. A floor cleaning apparatus, comprising:
a cleaning head including a cleaning device;
a control handle connected to the cleaning head for controlling the cleaning head; and
a micro power source in communication with the cleaning device, the micro power source including a fuel source and a chamber in communication with the fuel source, the chamber being configured to generate energy from a fuel communicated from the fuel source to power the cleaning device;
wherein the cleaning device is an ultrasonic plate in communication with the micro power source, the ultrasonic plate being configured to produce a plurality of vibrations using the energy generated by the micro power source, the cleaning device being configured to direct the vibrations from the ultrasonic plate in a direction of a floor to dislodge a plurality of foreign particles from the floor.

2. The floor cleaning apparatus as defined in claim 1, wherein the control handle is swivably connected to the cleaning head by a swivel assembly, the swivel assembly configured to allow a user to change a direction of movement of the cleaning head.

3. The floor cleaning apparatus as defined in claim 1, wherein the control handle includes a power switch in communication with the micro power source, the power switch being configured to selectively activate the micro power source.

4. The floor-cleaning apparatus as defined in claim 3, wherein the power switch is a conductivity contact being configured to activate the micro power source by a user.

5. The floor cleaning apparatus as defined in claim 3, wherein the micro power source is configured to generate about 0.2 W to about 200 W for powering the cleaning device.

6. The floor cleaning apparatus as defined in claim 1, wherein the micro power source is a fuel cell having a fuel cartridge disposed proximate the chamber, the fuel cartridge being configured to hold the fuel, the chamber being a reaction chamber configured to receive and generate the energy from an oxidation of the fuel.

7. The floor cleaning apparatus as defined in claim 6, wherein the oxidizing fuel generates a waste heat, the waste heat in communication with a fragrance solution, the fragrance solution being adapted to react with the waste heat to convey an aroma into a room as a floor is cleaned by the cleaning device.

8. The floor cleaning apparatus as defined in claim 6, wherein the fuel cartridge is configured to be refillable with a replacement supply of fuel.

9. The floor cleaning apparatus as defined in claim 6, wherein the fuel cartridge is a replaceable fuel cartridge.

10. The floor cleaning apparatus as defined in claim 1, further comprising a reservoir being configured to hold a fluid selected from the group consisting of a quantity of water, a quantity of cleaning solution, a quantity of fragrance and combinations thereof.

11. The floor-cleaning apparatus as defined in claim 10, further comprising a control mechanism being configured to selectively spray the water, the cleaning solution, the fragrance or combinations thereof.

12. A floor cleaning apparatus, comprising:
a cleaning head including a cleaning device;
a control handle connected to the cleaning head for controlling the cleaning head; and a micro fuel cell in communication with the cleaning device, the micro fuel cell comprising at least one fuel cartridge having a quantity of fuel disposed therein and a reaction chamber in communication with the fuel cartridge, the reaction chamber being configured to generate energy from an oxidation of the fuel to power the cleaning device;

wherein the cleaning device comprises an ultrasonic plate in communication with the fuel cell, the ultrasonic plate being configured to produce a plurality of vibrations using the energy generated by the fuel cell, the cleaning device being configured to direct the vibrations from the ultrasonic plate in a direction of a floor to dislodge a plurality of foreign particles from the floor.

13. The floor cleaning apparatus as defined in claim 12, wherein the control handle is swivably connected to the cleaning head by a swivel assembly, the swivel assembly configured to allow a user to change a direction of movement of the cleaning head.

14. The floor cleaning apparatus as defined in claim 12, wherein the control handle includes a power switch in communication with the micro fuel cell to selectively activate the micro fuel cell.

15. The floor-cleaning apparatus as defined in claim 14, wherein the power switch is a conductivity contact being configured to activate the micro fuel cell by a user.

16. The floor cleaning apparatus as defined in claim 12, wherein the fuel cartridge is configured to be refillable with a replacement supply of fuel.

17. The floor cleaning apparatus as defined in claim 12, wherein the fuel cartridge is a replaceable fuel cartridge.

18. The floor cleaning apparatus as defined in claim 12, further comprising a reservoir being configured to hold a fluid selected from the group consisting of a quantity of water, a quantity of cleaning solution, a quantity of fragrance solution and combinations thereof.

19. The floor-cleaning apparatus as defined in claim 18, further comprising a control mechanism being configured to selectively spray the water, the cleaning solution, the fragrance solution or combinations thereof.

20. The floor-cleaning apparatus as defined in claim 18, further comprising an intake member disposed adjacent the reaction chamber to protect the reaction chamber from the fluid.

21. A floor cleaning apparatus, comprising:
a cleaning head including a cleaning device;
a control handle connected to the cleaning head for controlling the cleaning head; and
a microturbine engine in communication with the cleaning device, the microturbine engine configured to generate energy to power the cleaning device;

wherein the cleaning device is an ultrasonic plate in communication with the microturbine engine, the ultrasonic plate being configured to produce a plurality of vibrations using the energy generated by the microturbine engine, the cleaning device being configured to direct the vibrations from the ultrasonic plate in a direction of a floor to dislodge a plurality of foreign particles from the floor.

22. The floor cleaning apparatus as defined in claim 21, wherein the control handle is swivably connected to the cleaning head by a swivel assembly, the swivel assembly configured to allow a user to change a direction of movement of the cleaning head.

23. The floor cleaning apparatus as defined in claim 21, wherein the control handle includes a power switch in communication with the microturbine engine to selectively activate the microturbine engine.

24. The floor-cleaning apparatus as defined in claim 23, wherein the power switch is a conductivity contact being configured to activate the microturbine engine by a user.

25. The floor-cleaning apparatus as defined in claim 21, wherein the microturbine engine includes a plurality of diffuser vanes and a plurality of compressor blades, the plurality of compressor blades being configured for rotation about the diffuser vanes to generate the energy.

26. The floor cleaning apparatus as defined in claim 25, further comprising a fuel cartridge being configured to hold a supply of fuel and a chamber being configured to receive and combust the fuel, the compressor blades being configured to rotate in response to a combustion gas generated by the combusted fuel.

27. The floor cleaning apparatus as defined in claim 26, wherein the fuel cartridge is configured to be refillable with a replacement supply of fuel.

28. The floor cleaning apparatus as defined in claim 26, wherein the fuel cartridge is a replaceable fuel cartridge.

29. The floor cleaning apparatus as defined in claim 21, further comprising a reservoir being configured to hold a fluid selected from the group consisting of a quantity of water, a quantity of cleaning solution, a quantity of fragrance solution and combinations thereof.

30. The floor-cleaning apparatus as defined in claim 21, further comprising a control mechanism being configured to selectively spray the water, the cleaning solution, the fragrance solution or combinations thereof.

* * * * *